United States Patent [19]

Pullukattu et al.

[11] 3,884,675

[45] May 20, 1975

[54] PRODUCTION OF TITANIUM COMPOUNDS FROM ORES CONTAINING OXIDES OF TITANIUM AND IRON

[75] Inventors: Joseph Thomas Pullukattu; Mathew Mathew Pulimoottil, both of Kerala, all of India

[73] Assignee: Kerala State Industrial Development Corporation, Kerala, India

[22] Filed: Sept. 11, 1972

[21] Appl. No.: 287,918

Related U.S. Application Data

[63] Continuation of Ser. No. 42,478, June 1, 1970, abandoned.

[52] U.S. Cl. ........................................ 75/1; 423/86
[51] Int. Cl. ............................................ C01g 23/08
[58] Field of Search ..................... 75/1; 423/69, 86

[56] References Cited
UNITED STATES PATENTS

| | | | |
|---|---|---|---|
| 2,127,247 | 8/1938 | Dawson et al. | 423/86 |
| 2,804,384 | 8/1957 | Armant et al. | 423/84 X |
| 2,815,272 | 12/1957 | Armant et al. | 423/84 X |
| 3,105,755 | 10/1963 | Green | 75/1 |
| 3,252,787 | 5/1966 | Shiah | 75/1 |
| 3,457,037 | 7/1969 | Aramendia et al. | 75/1 X |
| 3,502,460 | 3/1970 | Martin et al. | 75/1 |
| 3,597,189 | 8/1971 | Simha et al. | 75/1 |

FOREIGN PATENTS OR APPLICATIONS

| | | | |
|---|---|---|---|
| 217,520 | 10/1958 | Australia | 423/69 |
| 547,898 | 9/1942 | United Kingdom | 75/1 |
| 843,607 | 8/1960 | United Kingdom | 423/69 |

*Primary Examiner*—Allen B. Curtis
*Attorney, Agent, or Firm*—Stevens, Davis, Miller & Mosher

[57] ABSTRACT

The present invention relates in general to a process for producing titanium dioxide from ores containing mixed oxides of titanium and iron which include the steps of roasting the ore in air in powdered form at a temperature above 1000°C. to form ferric oxide, mixing the roasted ore with twice its volume of a dense form of carbon, heating the resultant mixture to a temperature of from 700°–900°C. in the absence of air to obtain a homogeneous mass, powdering the roasted mass, again roasting the mass in air to form titanium dioxide and separating out the titanium dioxide.

9 Claims, No Drawings

PRODUCTION OF TITANIUM COMPOUNDS FROM ORES CONTAINING OXIDES OF TITANIUM AND IRON

This is a continuation of application Ser. No. 42,478, filed June 1, 1970, now abandoned.

The present invention relates to the production of titanium compounds from ilmenite, rutile or other ores principally containing mixed oxides of titanium and iron.

The present invention provides a process for the production of titanium compounds from ilmenite, rutile or other ores principally containing mixed oxides of titanium and iron, which comprises either roasting the powdered ore at a temperature above 1000°C, or fusing the ore with solid potassium or sodium nitrate at 900°–1000°C, leaching the fused mass with water and filtering it to get a residue, said roasted ore or said residue being treated in the manner such as herein described either to obtain halogenated compounds of titanium free from iron contamination, or titanium dioxide free from iron contamination, as desired.

As a preferred embodiment the roasted ore is mixed with twice its volume of any dense form of carbon and the mixture is heated at or above 700°C in the absence of air, to obtain a homogeneous mass, and said mass is powdered prior to the treatment for obtaining titanium compounds free from iron contamination.

Preferably, the roasting of the powdered ore is continued till the ilmenite gets a pale brown colour, which is, for example, 4 to 6 hours. At this stage ferrous oxide is oxidized to ferric oxide and the bonds between titanium dioxide and oxide of iron present in the ore are loosened.

Our experience with a series of experiments shows that mere roasting does not take the oxidation to completion, thereby causing difficulties in halogenation or other treatment steps. It is found that fusing the ore with solid potassium or sodium nitrate gives an advantageous result, and a better product is obtained when such fused mass is subjected to subsequent treatment steps. Preferably, the ore is well powdered and mixed with powder of potassium or sodium nitrate in the ratio of 2:3, prior to the step of fusion.

The fusion breaks up the bonds between the oxides of titanium and iron and also oxidises the ferrous oxide to ferric oxide so that the whole iron oxide is in the form of ferric oxide. Preferably, the fusion is carried out at 900° to 1000°C for about 4 hours (and more preferably at 900° to 950°C for about 3 hours) so as to get a homogeneous mass. As it will be described hereinafter, the oxides of nitrogen that are evolved during the fusion are not wasted, but are utilized to obtain potassium or sodium nitrate, which can again be used for the fusion of fresh ores. Thus, it is possible to carry out the method in a cyclic manner.

It will also be described hereinafter that both the titanium oxide and iron oxide are recovered separately, and can be used commercially, and the other reagents than the potassium or sodium nitrate, such as ammonium bifluoride (or fluoride) and ammonia which are used during the subsequent treatment steps, to be described hereinafter, can be recovered and recycled. The filtrate which is obtained from the leach contains dissolved potassium or sodium hydroxide. Such filtrate may be used to absorb the oxides of nitrogen which are evolved during the initial step of fusion, and thereby potassium or sodium nitrate is regenerated in solution and can be recovered. Potassium or sodium nitrate thus recovered can be used in the initial step of fusion.

Instead of fusing the ore with solid potassium or sodium nitrate at 900°–1000°C, it can be fused or decomposed by heating the powdered ore with a mixture consisting of equal parts of potassium or sodium nitrate and potassium or sodium hydroxide at 700°C for 3 to 4 hours, in an open furnace or in presence of a current of air. This means, half the amount of potassium or sodium nitrate required previously, can be substituted with the hydroxide. Although heating in an open furnace or in presence of air is necessary, the temperature is cut down to 700°C, thereby causing greater economy. The mixture obtained after the heating, is non-magnetic. Hence any unreacted ilmenite which by itself is magnetic can be removed from the product of the above heating, by magnetic methods. After such removal of unreacted ilmenite the remaining non-magnetic product is leached well with water to remove the alkaline matter from the alkali nitrate or hydroxide. The removal of ilmenite by magnetic means can be done after the leaching step also. Then it is filtered off to get a mixture of oxides of titanium and iron. This mixture is easily acted on by even cold dilute mineral acids (preferably 15% hydrochloric acid). The iron oxide is then preferentially dissolved and removed by this cold treatment with dilute acid but not titanium dioxide. The content of titanium dioxide is thus raised to about 98%, at least above 95% by the acid treatment. Thus we get synthetic rutile from ilmenite and this has immense commercial potentiality. Further, the iron chloride in solution can be converted by known methods to iron oxide and used. Also, the alkaline matter brought into solution can be recovered and reused.

During the heating of the roasted ore with dense form of carbon iodine crystals may be employed as catalyst. Usually it takes more than 7 hours to get a homogeneous black lumpy mass out of said heating step. During such step care is taken that no white crust or powdery material is formed on the surface of the mass, as otherwise, the final yield will be reduced. It is believed that at this stage of heating titanium carbide and a refractory form of iron carbide are formed.

If desired, the black lumpy mass may be powdered and roasted in air so as to form titanium dioxide and separation of the same from the iron part may be effected mechanically e.g. by magnets. Magnetic belt may be employed.

Alternatively, the powdered mass may be halogenated and the halogenated compound of titanium free from iron contamination is recovered in the manner such as hereinafter described.

The halogenation of the powdered mass and recovery of the halogenated titanium compound may be done according to any of the following processes:

The lumpy black mass obtained on heating, as described herein above can be powdered without difficulty. On heating the powder, thus obtained by powdering, with sufficient quantity of ammonium fluoride to a temperature above 500°C, pure titanium tetrafluoride sublimes over and is condensed and collected. This compound is substantially free from iron contamination.

Ammonium bifluoride may be employed in place of ammonium fluoride. By heating the powdered mass with sufficient quantity of ammonium bifluoride at 450°–500°C pure titanium tetrafluoride sublimes over, and is condensed and collected.

Similarly, the powder can be heated with ammonium chloride to get a certain amount of formation of titanium tetrachloride. However, better result is achieved by direct chlorination which may be done as follows:

The powder is mixed with a small quantity of sodium chloride and iodine (both sodium chloride and iodine are not essential; their use is only advantageous) and heated in a stream of dry chlorine. Titanium tetrachloride selectively distills over at or above 200° to 250°C. This is condensed and collected as a liquid. This is obtained in a form containing only a very small percentage of iron contamination. (This is less than 0.1%)

In a similar manner, using bromine vapour or iodine vapour, the powder can selectively yield titanium tetra bromide or titanium tetra iodide.

Fluorine of hydrogen fluoride may also be used to obtain the titanium tetrafluoride free from iron contamination.

Similarly, the residue containing mainly titanium dioxide and ferric oxide, described above, may be treated further in a number of ways, depending on the end-product, that is desired.

A. TO PREPARE TITANIUM HALIDES

The residue is powdered and dried and mixed with twice or thrice its volume of a dense form of carbon and heated in a closed furnace, out of contact with air, at or above 700°C. Preferably, the mixture is heated at 700°–800°C for 6 hours or at 800°–900°C for about 4 hours. The resultant mass is then powdered, preferably mixed with a small quantity of sodium chloride and iodine and the mixture may then be treated as follows:

a. The powder or the mixture thereof with sodium chloride and iodine, is kept heated to 200°–250°C. and dry chlorine is passed over it in a slow stream. Pure titanium tetrachloride distils over and can be condensed and collected as a liquid. It contains less than 0.1% of iron contamination.

b. The powder or the mixture thereof which sodium chloride and iodine is further mixed with ammonium fluoride (15 g. of ammonium fluoride for 10 g. of ilmenite used as starting material) and heated to 500°C., when very pure titanium tetrafluoride distils over, is condensed and collected as a solid. Ammonium fluoride may be replaced by ammonium bifluroide in the aforesaid and heating is preferably at 450°–500°C.

c. Vapours of bromine, fluorine or iodine are passed over the heated powder or the mixture thereof with sodium chloride and iodine, when titanium tetrabromide, fluoride or iodide distils over and can be dondensed and collected.

B. TO PREPARE TITANIUMDIOXIDE i. The residue of titanium dioxide and ferric oxide is powdered and added with good stirring to a 15% solution of ammonium bifluoride in water (e.g. 18g. of ammonium bifluoride for 10g. of ilmenite started with) at room temperature, or to a hot solution of ammonium fluoride at or above 80°C. By stirring for, say, 4 hours, the titanium dioxide is selectively brought into solution while only about 1% of iron oxide dissolves. Afterwards the residue of undissolved ferric oxide (nearly 99%) is filtered off, washed with water and dried.

The filtrate containing the dissolved titanium species can be concentrated to crystallisation yielding ammonium hexafluorotitanate (IV). Or, ammonia can be bubbled into the whole filtrate so that the pH of the solution rinses above 9, when hydrated titanium dioxide is completely precipitated. Preferably, the pH is raised to 10. This is filtered off, washed with a little dilute mineral acid to remove iron contamination, washed again with water and ignited.

The filtrate from which the hydrated titanium dioxide is filtered off, now contains ammonium fluoride and excess ammonia. By boiling this filtrate, the excess ammonia is expelled and recovered. The remaining hot solution of ammonium fluoride itself can be used at 90°C. or above to treat further quantities of the residue of titanium dioxide and ferric oxide. However, if room temperature reaction is preferred, the ammonium fluoride in solution may be converted to ammonium bifluoride by known methods and used again to process further quantities of the residue, as described above. Thus, recycling is made possible and material loss can be avoided. To convert the ammonium fluoride solution to ammonium bifluoride solution diluted hydrofluoric acid is added to the solution of ammonium fluoride, after cooling.

ii. Very pure pigment-grade titanium dioxide may be obtained in the following manner:

The residue of titanium dioxide and ferric oxide is stirred at room temperature for, say, four hours with 15% ammonium bifluoride solution so as to dissolve the titanium species, as described before. The undissolved ferric oxide is removed by filtration. The filtrate contains in addition to the titanium species, about 1% dissolved iron. Therefore, ammonia is bubbled into this filtrate until the pH rises to 5.5–6. The hydrogen sulphide is bubbled in with stirring, when the dissolved iron is precipitated out as the iron sulphide but not the titanium in solution. After filtering away this residue of iron sulphide ammonium titanium fluoride may be crystallised out, if necessary, or the pH may be raised above 9 with ammonia, when hydrated titanium dioxide is completely precipitated. This is filtered, washed with water, ignited to oxide and cooled. This gives very pure pigment-grade titanium dioxide.

Alternatively, on raising the pH of the filtrate above 9 with ammonia and later boiling for 5 to 6 minutes, hydrated titanium dioxide is completely precipitated. This modification gives practically very pure hydrated titanium dioxide and the percentage of iron oxide is usually 0.2 to 0.4 and never above 1 percent. This can be further purified, if necessary, by said leaching separately. Also, there is no need to use hydrogen sulphide.

As a further alternative, the boiling may be done before and ammonia may be added later to raise pH above 10. In fact, this is a better procedure to get pure titanium dioxide.

The further processing and reusing of the filtrate (left after removing the hydrated titanium dioxide) which contains ammonium fluoride and excess ammonia may be done exactly in the same manner as described in B (i) above.

If desired, the residue may be powdered well and intimately mixed with half its weight of powdered charcoal and heated in a closed furnace, out of contact with air, at 450° to 500°C. for about 6 hours. As a result of this heating the iron oxide becomes magnetic in properties, probably by becoming the magnetic oxide of iron. The pale dark brown powder, thus obtained, may then be subjected to magnetic separation, whereby most of the iron oxide is removed. Thus, synthetic rutile of high grade may be obtained. Magnetic separation is preferably done by employing magnetic bolt.

The residue may be dissolved in 5 N (or above) sulphuric acid at room temperature with good stirring. Towards the end of the dissolution, a few pieces of granulated zinc may be advantageously added to increase the speed of dissolution. It is then filtered and from the filtrate, hydrated titanium dioxide is selectively precipitated by adding washing soda and raising the pH above 2. It is filtered off, purified by washing with very dilute acid, then with water and dried.

Concentrated hydrochloric acid also selectively dissolves out the ferric oxide, raising the percentage of titanium dioxide to about 96–97%.

The iron part of the ilmenite or other ores is left behind as iron carbide, which has commercial value. This may have a variable composition. This may be used as such commercially, or ignited to ferric oxide and used.

The dense form of carbon used in the process described above is, for example, coke, coal, or coaltar (road tar).

The invention is illustrated in the following examples:

EXAMPLE 1

Ilmenite was powdered to 325 mesh or over and roasted in air at a temperature above 1000°C, so that the ferrous oxide in it was oxidised. This was continued for 4 to 6 hours, so that the ilmenite got a pale brown colour.

The roasted ilmenite was mixed with twice its bulk of a dense form oxocarbon, such as coke, coal, coaltar (road tar) and a small quantity of iodine crystals as catalyst and heated at 700°C or above, in the absence of air for such time that a homogeneous black lumpy mass was obtained. Usually, this took more than seven hours. Care was taken that no white crust or powdery material was formed on the surface during the heating.

The lumpy black mass obtained on heating was powdered without difficulty. On heating the powder, thus obtained by powdering, with sufficient quantity of ammonium fluoride to a temperature above 500°C, pure titanium tetrafluoride sublimed over and was condensed and collected. This compound was found to be substantially free from iron contamination.

Similarly, the powder was heated with ammonium chloride to get a certain amount of formation of titanium tetrachloride.

In another experiment the powder was mixed with a small quantity of sodium chloride and iodine and heated in a stream of dry chlorine. Titanium tetrachloride selectively distilled over above 200° to 250°C. This was condensed and collected as a liquid, which was found to contain only a very small percentage of iron contamination (e.g. less than 0.1 %).

In a similar manner, using bromine vapour or iodine vapour, the powder selectively yielded titanium tetra bromide or titanium tetra iodine.

EXAMPLE 2

As with ilmenite, rutile was first roasted in air at 1000°C for 6 hours. Then it was mixed with twice its bulk of powdered carbon and heated out of contact with air at 700°C. The mixture was next powdered and heated with ammonium fluoride at a temperature above 500°C, whereby pure titanium tetrafluoride sublimed over and was condensed and collected. Chlorination of the same powder also gave volatile titanium tetrachloride which was collected as a liquid.

EXAMPLE 3

10g. of ilmenite was heated with 14g. of solid potassium nitrate at 1000°C. for 2 hours or more to yield a distinct homogeneous mass different in nature from ilmenite. The fused mass was cooled and digested with water and filtered. The filtrate so obtained was used in absorbing the oxides of nitrogen which were evolved during the fusion. The potassium nitrate so obtained in solution was concentrated, crystalised out and was used for the fusion of fresh ilmenite. The residue obtained from 10g. of ilmenite as starting material was then mixed with 18g. of ammonium bifluoride previously dissolved in water to form a 15% aqueous solution, and was stirred for 3 to 4 hours at room temperature. A plastic vessel was used for this. Under the above controlled conditions, the titanium dioxide completely went into solution while only 1% of the oxide of iron was dissolved. The oxide of iron, mainly ferric oxide, remained as insoluble residue (except for about 1% dissolved). Such residue was filtered off and washed clean with water for commercial use. The filtrate contained the titanium species in solution. Ammonium hydroxide was carefully added into it. In the alternative procedure ammonia was bubbled through it. As a result titanium dioxide was completely precipitated out as hydrated titanium dioxide and was recovered by filtration. Such dioxide was given another leach with a dilute mineral acid to obtain pigment-grade titanium dioxide. The filtrate, after the removal of titanium dioxide, contained in solution ammonium fluoride with excess ammonia, which was converted to ammonium bifluoride for use in fresh experiments.

EXAMPLE 4

40 g of powdered ilmenite was fused with 20 g of sodium nitrate and 20 g of sodium hydroxide or with 20 g potassium nitrate and 20 g of potassium hydroxide. Thus the weight of flux used for the fusion was considerably reduced. The fusion was done in an open furnace or in presence of a current of air. It was enough to hold the temperature at 700°C for 3 or 4 hours.

After the fusion, the product was leached well with water to recover the alkaline matter. The residue left was a mixture of titanium dioxide and ferric oxide and yet it was easily acted on selectively by 15% hydrochloric acid. It dissolved the iron oxide even in the cold, but advantageously on slight warming and stirring. The titanium dioxide was not dissolved and hence its percentage raised well over 96%, (up to 99.5%). This was synthetic rutile.

What we claim is:

1. A process for the production of titanium dioxide from ores principally containing mixed oxides of titanium and iron which comprises roasting the ore in air in powdered form at a temperature above 1000°C. to form the iron oxide into ferric oxide, mixing said roasted ore with twice its volume of a dense form of carbon, heating said mixture to a temperature of from 700°–900°C. in the absence of air to obtain a homogeneous mass reactable with chlorine to less than 0.1% iron contamination, powdering said mass, roasting said powdered mass in air to form titanium dioxide and separating the remainder of the mass from the titanium dioxide.

2. The process of claim 1 in which the remainder of the mass is separated magnetically.

3. The process of claim 2 in which said magnetic separation is accomplished by bringing said powdered mass into contact with a magnetic belt.

4. The process of claim 3 in which the roasting of the powdered ore is continued until it reaches a pale brown color.

5. The process of claim 4 in which the roasting is effected for about 4 to 6 hours.

6. The process of claim 5 in which iodine crystals are employed as catalyst during the heating of the roasted ore with said dense form of carbon.

7. The process of claim 6 in which the heating of the roasted ore with the dense form of carbon is continued for more than 7 hours to obtain a homogeneous black lumpy mass.

8. The process of claim 7 in which said dense form of carbon is selected from the group consisting of coke, coal and coal tar.

9. The process of claim 8 in which the remainder of the mass after recovering the titanium dioxide is iron carbide, which iron carbide is ignited to yield ferric oxide.

* * * * *